(12) United States Patent
Ganji et al.

(10) Patent No.: US 12,480,822 B2
(45) Date of Patent: Nov. 25, 2025

(54) WIDE RANGE TEMPERATURE-TO-DIGITAL CONVERTER WITHOUT EXPLICIT DATA CONVERTERS

(71) Applicant: Iowa State University Research Foundation, Inc., Ames, IA (US)

(72) Inventors: Mona Ganji, Ames, IA (US); Degang James Chen, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 450 days.

(21) Appl. No.: 18/095,853

(22) Filed: Jan. 11, 2023

(65) Prior Publication Data

US 2024/0011845 A1 Jan. 11, 2024

Related U.S. Application Data

(60) Provisional application No. 63/358,953, filed on Jul. 7, 2022.

(51) Int. Cl.
*H03M 1/12* (2006.01)
*G01K 7/00* (2006.01)
*H03M 1/34* (2006.01)

(52) U.S. Cl.
CPC ............ *G01K 7/00* (2013.01); *H03M 1/34* (2013.01); *G01K 2219/00* (2013.01)

(58) Field of Classification Search
CPC ........ G01K 7/00; G01K 2219/00; G01K 7/01; H03M 1/34
USPC ...................................................... 341/155
See application file for complete search history.

(56) References Cited

U.S. PATENT DOCUMENTS

| 6,991,369 | B1 * | 1/2006 | Garavan | G01K 7/01 374/170 |
| 11,514,990 | B1 * | 11/2022 | Kumar | G11C 5/147 |
| 11,619,961 | B1 * | 4/2023 | Pietri | G05F 3/30 327/539 |
| 2010/0166035 | A1 * | 7/2010 | Yoon | G01K 7/01 327/512 |

(Continued)

OTHER PUBLICATIONS

Chung, C.-C. et al., "An All-Digital Smart Temperature Sensor with AutoCalibration in 65nm CMOS Technology," 2010 IEEE International Symposium on Circuits and Systems, May 30-Jun. 10, 2010, Paris, France, IEEE, 4 pages.

(Continued)

*Primary Examiner* — Jean B Jeanglaude
(74) *Attorney, Agent, or Firm* — Withrow & Terranova, PLLC (57) ABSTRACT

The present disclosure relates to a temperature-to-digital converter that fulfills the requirement of sensing temperature in applications, such as automotive, where operation in a wide temperature range is essential. Due to the dependency of the transistor models on the temperature, the conventional temperature sensors have a limited range in which they have an acceptable function. The disclosed sensor overcomes this problem by introducing a design independent of the transistor model and relies on cancelling and matching temperature non-linearity of different blocks. The approach according to the present disclosure enables the design of a temperature sensor that is operational in the never before achieved range of −55° C. to 200° C.

18 Claims, 5 Drawing Sheets

(56) References Cited

U.S. PATENT DOCUMENTS

| | | | |
|---|---|---|---|
| 2013/0060499 A1* | 3/2013 | Yoshimura | G01K 7/01 |
| | | | 702/99 |
| 2017/0227409 A1* | 8/2017 | Wadhwa | G01K 13/00 |
| 2017/0257113 A1* | 9/2017 | Singh | G01K 7/01 |
| 2023/0140251 A1* | 5/2023 | Dwivedi | H03M 1/0619 |
| | | | 374/170 |
| 2023/0296451 A1* | 9/2023 | Rajendran | G01K 15/005 |
| | | | 374/1 |

OTHER PUBLICATIONS

De Venuto, D. et al., "Low Power High-Resolution Smart Temperature Sensor for Autonomous Multi-Sensor System," IEEE Sensors Journal, vol. 12, issue 2, Dec. 2012, first published May 2012, IEEE, 8 pages.

Makinwa, K.A.A., "Smart temperature sensors in standard CMOS," Procedia Engineering, vol. 5, Dec. 2010, Elsevier Ltd., 10 pages.

Ren, Y. et al., "An All CMOS Temperature Sensor for Thermal Monitoring of VLSI Circuits," 2009 IEEE Circuits and Systems International Conference on Testing and Diagnosis, Apr. 28-29, 2009, Chengdu, China, IEEE, 5 pages.

Yousefzadeh, B. et al., "A BJT-Based Temperature-to-Digital Converter With a+0.25° C. 3σ-Inaccuracy From-40° C. to+ 180° C. Using Heater-Assisted Voltage Calibration," IEEE Journal of Solid-State Circuits, vol. 55, No. 2, Apr. 2017, IEEE, 9 pages.

* cited by examiner

WIDE RANGE TEMPERATURE-TO-DIGITAL CONVERTER WITHOUT EXPLICIT DATA CONVERTERS

RELATED APPLICATIONS

This application claims the benefit of provisional patent application Ser. No. 63/358,953, filed Jul. 7, 2022, the disclosure of which is hereby incorporated herein by reference in its entirety.

FIELD OF THE DISCLOSURE

The present disclosure relates to a temperature sensor, and more particularly to a wide range temperature to digital converter without explicit data converters.

BACKGROUND

Figure 1:
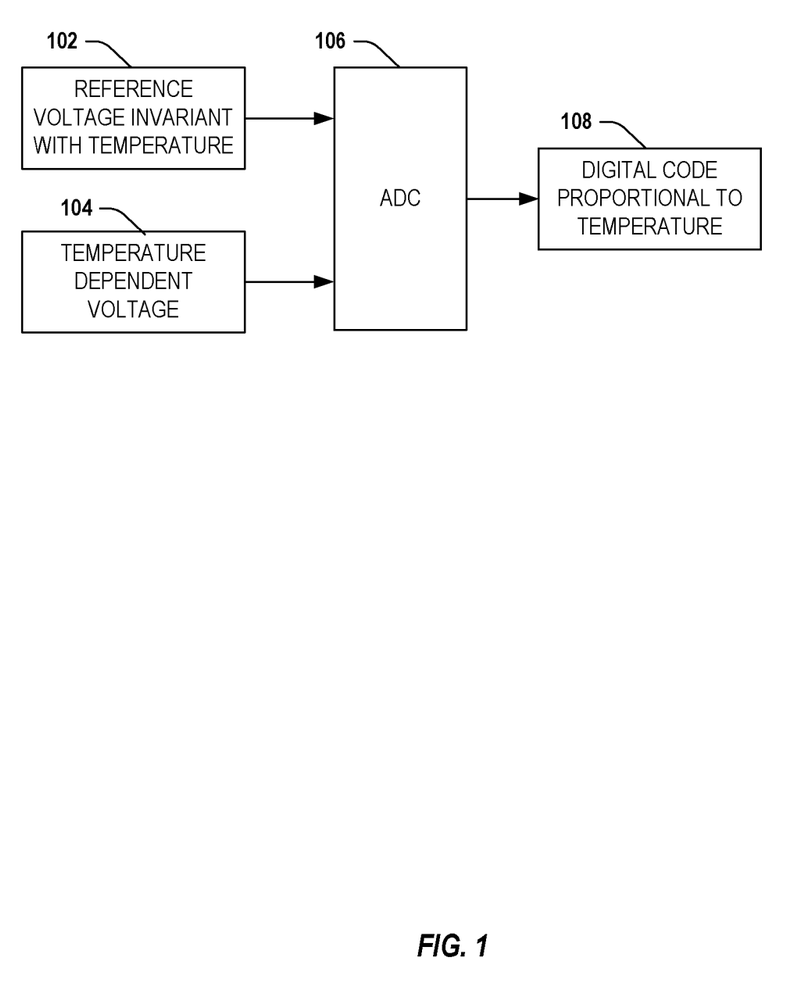
FIG. 1 is a block diagram of a conventional smart temperature sensor.

The basic principle in any smart temperature sensor is to introduce a voltage (or current) invariant with temperature and a linearly temperature dependent voltage (or current). Then, an analog-to-digital converter (ADC) provides a digital representation of the sensed temperature by comparing these two parameters. An example of a traditional temperature sensor is shown in FIG. 1, where an ADC 106 receives a reference voltage 102 that is invariant with respect to temperature and a temperature dependent voltage 104. The ADC 106 then compares the two voltages to determine the temperature.

The degree of the temperature linearity of the temperature dependent voltage and the constancy of the reference voltage across the target temperature range are significant factors that determine the accuracy of the digitized output representation of the temperature. A high precision ADC that maintains its function across the desired temperature range is another requirement for achieving reliable smart temperature sensing. Several methods for improving the linearity of the temperature sensor, such as second-order curvature correction and dynamic element matching, have been presented to improve the linearity of the temperature sensing unit. Numerous reference voltage structures with high accuracy during the operation of the temperature sensor were exclusively designed for this purpose. These different specialty sensors are expensive however, and rely on complex designs, explicit data converters, and additional circuits to account for non-linearities in the temperature sensors.

SUMMARY

The present disclosure relates to a temperature-to-digital converter that fulfills the requirement of sensing temperature in applications, such as in automotive applications, where operation in a wide temperature range is beneficial. Due to the dependency of the transistor models on the temperature, the conventional temperature sensors have a limited range in which they have an acceptable function. The disclosed sensor overcomes this problem by introducing a design independent of the transistor model and relies on cancelling and matching temperature non-linearity of different blocks. The approach according to the present disclosure enables the design of a temperature sensor that is operational in the range of −55° C. to 200° C. which has never been achieved before.

In an embodiment, a method of operation of a temperature to digital converter to determine a temperature can be provided. The method can include converting, by a voltage to current converter block, a reference voltage to a temperature independent current. The method can also include generating, by a digitizing block, a digitally controlled current based on the temperature independent current and a digital input code selected by a digital controller, wherein the digitally controlled current is associated with a digitally controlled voltage. The method can also include generating a proportional to absolute temperature voltage ($V_{PTAT}$) by a $V_{PTAT}$ generator. The method can also include in response to determining that a difference between the digitally controlled voltage and the $V_{PTAT}$ is below a predetermined threshold, determining the temperature that corresponds to the digital input code.

In another embodiment, a temperature to digital converter circuit that determines a temperature can be provided. The temperature to digital converter circuit can include a voltage to current converter block that converts a reference voltage to a temperature independent current. The temperature to digital converter circuit can include a digital controller that selects a digital input code. The temperature to digital converter circuit can include a digitizing block that generates a digitally controlled current based on the temperature independent current and the digital input code, wherein the digitally controlled current is associated with a digitally controlled voltage. The temperature to digital converter circuit can include a proportional to absolute temperature voltage ($V_{PTAT}$) generator that generates a $V_{PTAT}$. The digital controller can also determine that a difference between the digitally controlled voltage and the $V_{PTAT}$ is below a predetermined threshold, and determines the temperature that corresponds to the digital input code.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to a temperature-to-digital converter that fulfills the requirement of sensing temperature in applications, such as automotive, where operation in a wide temperature range is essential. Due to the dependency of the transistor models on the temperature, the conventional temperature sensors have a limited range in which they have an acceptable function. The disclosed sensor overcomes this problem by introducing a design independent of the transistor model and relies on cancelling and matching temperature non-linearity of different blocks. The approach according to the present disclosure enables the design of a temperature sensor that is operational in the range of −55° C. to 200° C. which has never been achieved before.

Moreover, unlike the conventional design of temperature sensors, no explicit, stand-alone signal processing units are employed. The digitization unit is incorporated into the sensing unit, constructing a feedback loop that enables the wide range of operation. The design according to the present disclosure is fully operational in the temperature range of −55° C. to 200° C., with a resolution of 2° C., which can be improved to 0.25° C.

The disclosed design relies on matching and cancelling of high-order curvature and high-temperature behavior between the sensing unit and the digitizing unit rather than adding extra circuits to improve temperature linearity. Unlike previously proposed smart sensors which employ not only a stand-alone analog-to-digital converter but also additional enhancement circuitry such as dynamic element matching and chopping circuits to achieve high accuracy, the disclosed temperature-to-digital code design uses a simple digitizing unit that, by design, has similar temperature and current-voltage (I-V) nonlinearity profile as the sensing unit. The smart temperature sensor according to the present disclosure can be fully integrated in complementary metal oxide semiconductor (CMOS) technology on a system on a chip. The disclosed matching design is also independent of the device model, which makes it a suitable design for operation in any operating region.

The degree of the temperature linearity of the temperature-dependent voltage and the constancy of the reference voltage across the target temperature range are significant factors that determine the accuracy of the digitized output representation of the temperature. A high-precision analog-to-digital converter that maintains its function across the desired temperature range is another requirement for achieving reliable smart temperature sensing. Several methods for improving the linearity of the temperature sensor, such as second-order curvature correction and dynamic element matching, have been presented to improve the linearity of the temperature sensing unit. Numerous reference voltage structures with high accuracy during the operation of the temperature sensor were exclusively designed for this purpose. Employing these enhancement methods, the accuracy of the smart temperature sensor can be improved to ±0.25° C. for the range of −40° C. to 180° C., which is a range currently reported in CMOS technology. However, for the thermal management application in the automotive industry with multiple temperature sensors on a chip, the accuracy of 2° C. is sufficient, and area and design simplicity are of significant importance.

Figure 2:
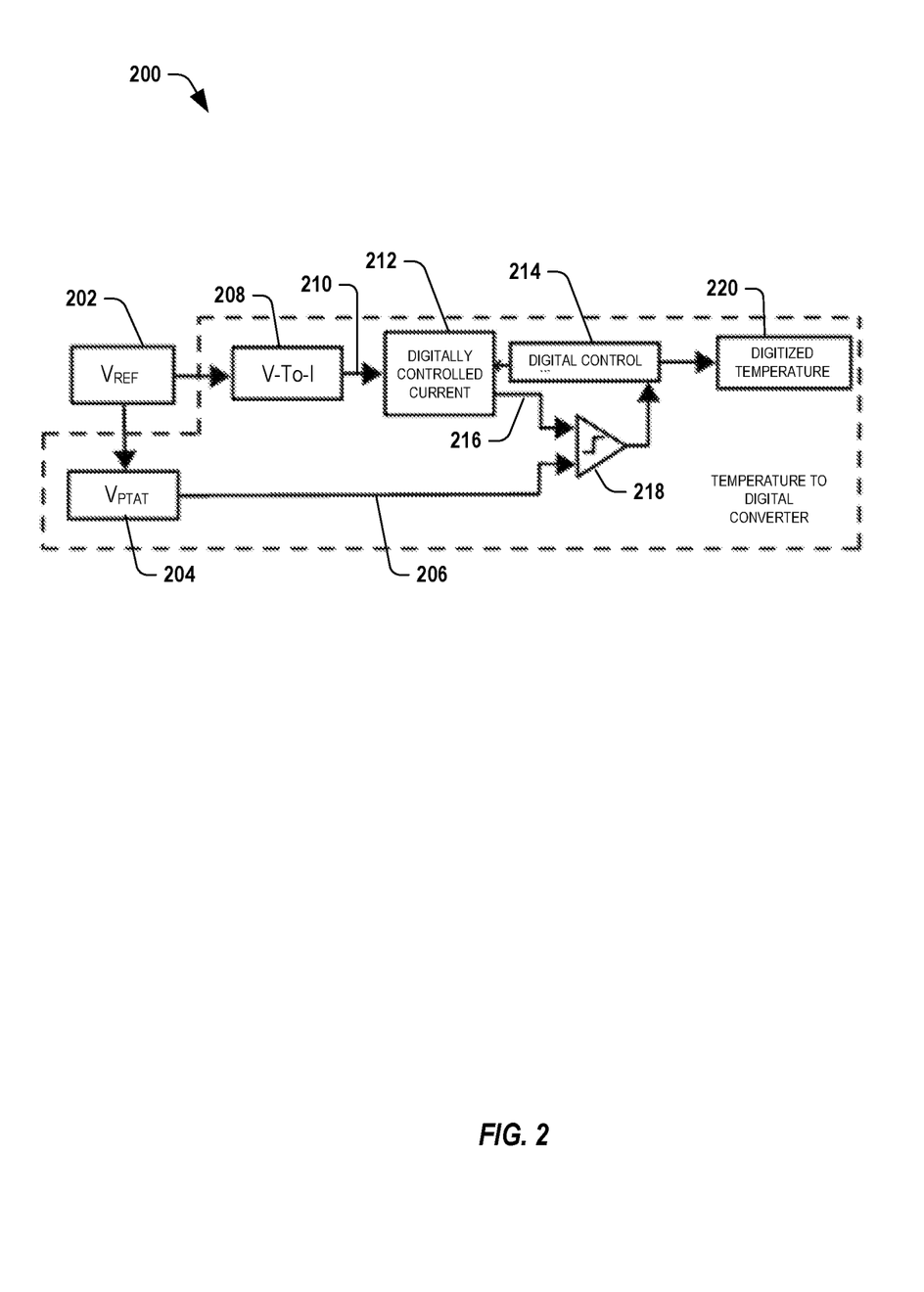
FIG. 2 is a block diagram of the smart temperature sensor according to one or more embodiments of the present disclosure.

FIG. 2 represents the high-level block diagram of the disclosed temperature sensor or temperature to digital converter 200. The design requires a moderate temperature-independent reference voltage 202, which is a fundamental block in every system on a chip. This reference voltage 202 is then converted to a temperature-independent current 210, utilizing a voltage-to-current converter block 208. In the next step, this constant current 210 is mirrored into a digitizing block 212 to generate a digitally controlled current. The current generated in this block ideally depends only on a digital input code supplied by a digital controller 214 and is independent of the temperature. Using this current, a digitally controlled voltage, $V_O$, 214 is generated which later will be compared by a comparator 218 with the proportional-to-absolute temperature (PTAT) voltage, $V_{PTAT}$ 206 generated by a $V_{PTAT}$ generator 204. The temperature-sensing parameter can also be extracted from the reference voltage 202, so there is no need for extra circuits to be integrated on the chip. The working principle of the temperature to digital converter 200 is to find a digital code that generates a $V_O$ 216 closest to the $V_{PTAT}$ 206 of the respective temperature. This digital code can be considered the digital representation of the temperature 220.

The temperature and I-V nonlinearity sources in the disclosed design that degrade the accuracy of the temperature sensor are the non-constancy of the temperature-independent reference voltage 202, an imperfect voltage-to-current conversion, nonlinearity in the digitally controlled current due to mirroring, the intrinsic offset of the comparator 218, and finally nonlinearity in $V_{PTAT}$ 206. The equations for $V_O$ 216 and $V_{PTAT}$ 206 voltage can be written as follows:

$$V_O = \alpha \cdot \text{Code} \cdot (V_{REF} + f_{VREF}(T)) \cdot f_{VOI} \cdot f_{DCC} \quad (1)$$

and $$V_{PTAT} = \beta \cdot (T + f_{PTAT}(T)) \cdot f_m \quad (2)$$

$V_{REF}$ represents the ideal constant voltage reference, $f_{VREF}(T)$ is the temperature-dependent nonlinearity of the reference voltage, and $f_{VOI}$ and $f_{DCC}$, respectively, represent the imperfections in voltage-to-current conversion and digital current control, which are of I-V nonlinearity. Similarly, for the $V_{PTAT}$ generator 204, there is a temperature nonlinearity $f_{PTAT}(T)$ and an imprecise mirroring function $f_m$. The coefficients $\alpha$ and $\beta$ are resistive ratios that can be assumed to be temperature-independent by a careful layout design.

Therefore, if one ensures that the total nonlinearity of the $V_O$ cancels the nonlinearity of the $V_{PTAT}$, such that the remaining difference between $V_O$ 216 and $V_{PTAT}$ 206 is less than half a least significant bit across the temperature range, then the accuracy objective has been achieved.

The main design procedure for the disclosed smart temperature sensor involves properly identifying the nonlinearity sources in $V_{PTAT}$ 204 and $V_O$ generator circuits, understanding the parameters that would affect these added nonlinearities, and finally controlling these parameters so that for the temperature range, $|V_{PTAT} - V_O| \leq 0.5$ LSB.

Figure 3A:
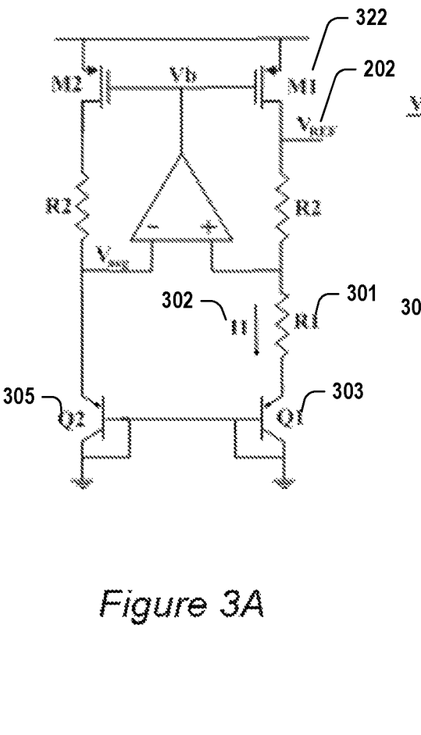
FIG. 3A is a circuit diagram showing the Kuijk bandgap of a circuit realization of the smart temperature sensor according to one or more embodiments of the present disclosure.

FIGS. 3A to 3D show the circuit realization of the smart temperature sensor according to the present disclosure. In this design, the Kuijk bandgap circuit in FIG. 3A is used as the voltage reference and as the current source for the $V_{PTAT}$ generating circuit. The current through the $R_1$ 301 is $I_1 = \Delta V_{BE}/R_1$, which makes it a PTAT current, since $\Delta V_{BE} = \ln(n) \cdot k \cdot T/q$, where n is the ratio of the area of Q1 303 to the area of Q2 305. By mirroring this $I_1$ current 302 into the temperature sensing block depicted in FIG. 3B, and more particularly into resistor $R_P$ 304 using the M5 transistor 306, the PTAT voltage $V_{PTAT}$ 206 is generated.

Figure 3B:
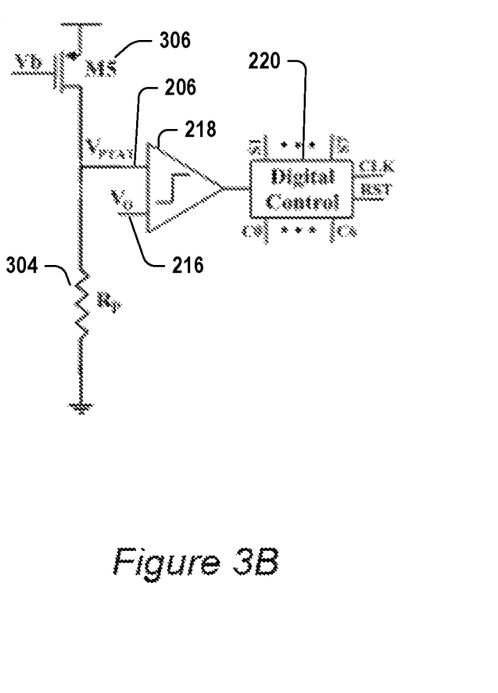
FIG. 3B is a circuit diagram showing the temperature-sensing block, comparator, and digital controller of a circuit realization of the smart temperature sensor according to one or more embodiments of the present disclosure.
Figure 3C:
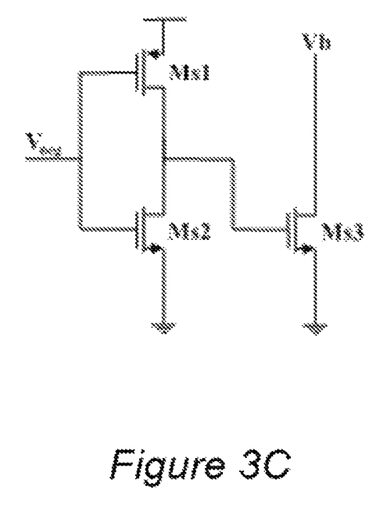
FIG. 3C is a circuit diagram showing the bandgap's start-up circuit of a circuit realization of the smart temperature sensor according to one or more embodiments of the present disclosure.

FIG. 3C is startup circuit that ensures the correct operation of the band gap circuit in FIG. 3A. The bandgap Voltage reference circuit in FIG. 3A, has two stable states of operation of which only one is favorable for correct operation of circuit. The startup circuit in FIG. 3C forces the bandgap voltage reference circuit into the favorable state of operation to ensure that it works correctly.

Figure 3D:
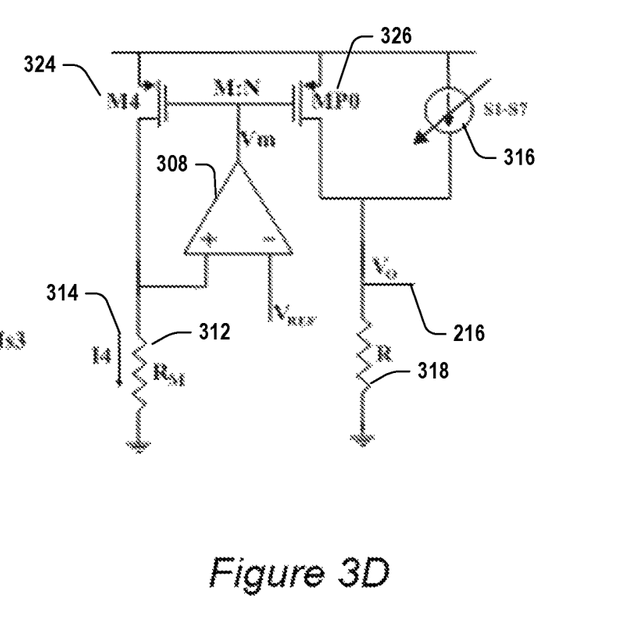
FIG. 3D is a circuit diagram showing the digitizing block of a circuit realization of the smart temperature sensor according to one or more embodiments of the present disclosure.

The utilized voltage-to-current circuit of the digitizing block depicted in FIG. 3D consists of an operational amplifier 308 and a resistor $R_m$ 310, which produces the current $I_4 = V_{REF}/R_m$. This constant current $I_4$ 314 is then mirrored into a binary weighted transistor array in order to create a digitally controlled current block that is independent of temperature. The current from this block, which is controlled by the logic unit 316 and the output of the comparator 308, will flow through the resistor $R_O$ 318, producing the comparison voltage $V_O$ 216. This $V_O$ voltage 216 is used as a comparison parameter with $V_{PTAT}$ 206 to generate a digital code proportional to temperature.

However, as mentioned previously, there are several nonlinearity sources that would degrade the accuracy of the temperature sensor. One of the major sources of nonlinearity in this design is the non-constancy of $V_{REF}$ across the temperature that consequently results in the current $I_4$ 314 not being independent of temperature. The other factors are nonideal current mirroring of $I_4$ 314 into the binary weighted current mirrors and added nonlinearity in mirroring of the current $I_1$ 302 into M5 306. The final major error source is that the current $I_1$ 302, which is the $I_{PTAT}$ current in this design, contains high-order temperature nonlinearity that makes it not a true PTAT current with cross point of 0 A at 0 K.

Independent of the region in which a CMOS transistor operates, the current equation of the CMOS transistor can be written as follows:

$$I_d = \left(\frac{W}{L}\right) \times F(V_{gs}, V_{bs}) \times (1 + \lambda VDext) \quad (3)$$

If the foregoing current equation for M1 322, M5 306, M4 324, and MP0 326 is derived, one can deduce that the function F, which is dependent on $V_{gs}$ and $V_{bs}$, is equal for the pairs of M1 322, M5 306 and M4 324, MP0 326, since they share the same $V_{gs}$ and $V_{bs}$ voltages. Also, $I_1 = \Delta V_{BE}/R_1$ and $I_4 = V_{REF}/R_m$. Then replacing the F function for $I_5$ and $I_0$, the following equations can be derived for $V_O$ 216 and $V_{PTAT}$ 206, which are independent of $V_{gs}$ and $V_{bs}$ voltages.

$$V_O = \frac{V_{REF}}{R_m} \cdot \frac{N = Code.W_0}{M} \cdot \frac{(1 + \lambda VDext_0)}{(1 + \lambda VDext_4)} \cdot R_O \quad (4)$$

$$V_{PTAT} = \frac{W_5}{W_1} \cdot \frac{\Delta V_{BE}}{R_1} \cdot \frac{(1 + \lambda VDext_5)}{(1 + \lambda VDext_1)} \cdot R_P \quad (5)$$

$W_0$ is the smallest width (least significant bit, LSB) in the binary transistor array, and N and M indicate the width of MP0 326 and M4 324, respectively. The foregoing equations are valid for the transistor operating in the week, moderate, or strong inversion. $VDext_i$ is the difference between $V_{ds}$ of the ith transistor and saturation drain-source voltage, or $V_{on}$, of the ith transistors. These VDext voltages, therefore, can be written as follows:

$$VDext_5 = VDD - V_{PTAT} - VDsat_5$$

$$VDext_0 = VDD - V_O - VDsat_0$$

$$VDext_1 = VDD - V_{REF} - VDsat_1$$

$$VDext_4 = VDD - V_{REF} - VDSat_4 \quad (6)$$

From Equation (6), one can observe that $VDext_1$ and $VDext_4$ can be set equal by making the $VDsat_1$ and $VDsat_4$ equal. Similarly, by making $VDsat_5$ and $VDsat_0$ equal in design, one can make $VDext_5$ and $VDext_0$ equal because $V_O$ 216 converges to $V_{PTAT}$ 206.

Now, if $V_O$ 216 is equal to $V_{PTAT}$ 206, since $VDext_5$ and $VDext_0$ are equal by design, the terms $(1+\lambda VDext_5)$ and $(1+\lambda VDext_0)$ can be canceled from both sides of the equation. Likewise, $(1+\lambda VDext_4)$ and $(1+\lambda VDext_1)$ also cancel. Hence, the equation can be simplified to the following:

$$\frac{W_5}{W_1} \times \frac{\Delta V_{BE}}{V_{REF}} \times \frac{R_P}{R_1} \times \frac{R_m}{R_o} \times (1 + f(T)) + V_{OS} = \frac{N + Code.W_0}{M} + Q_e \quad (7)$$

In Equation (7), $f(T)$ represents the higher order nonlinearity of the resistive ratio. One can assume that, by performing careful common-centroid layout implementation and placing the resistors close to each other in the layout to avoid gradient errors, the first-order temperature dependency of the resistors cancels each other in the ratio. The remaining high-order temperature dependency of $f(T)$ is small and is neglected. $V_{OS}$, in Equation (7), is the offset of the comparator that affects the accuracy of the sensor. Finally, $Q_e$ indicates the quantization error.

The design procedure of the smart temperature sensor initiates with choosing the proper values of $R_P$ and $R_O$. These parameters, besides the sizing ratio of M5, M1 and M4, MP0, determine the range of the $V_{PTAT}$ 206 and $V_O$ 216. The range of $V_{PTAT}$ 206 and $V_O$ 216 determines the LSB value and hence sets the maximum allowed nonlinearity and maximum tolerable offset voltage of the comparator. After specifying the range and determining the $V_{OS}$ of the comparator, one can start designing the sensor so that $|V_{PTAT} - V_O| \leq 0.5 LSB - V_{OS}$.

Then, the carefully selected values of the resistors and M5/M1 are placed in Equation (7). The left-hand side of the equation has all the required values. Based on the number of bits that sets the resolution of the sensor, the N/M ratio and $W_0$ can be derived from Equation (7). By setting the code to "0," which represent the coldest sensed temperature, the N/M ratio can be extracted. Now, by substituting the extracted N/M ratio in the right-hand side of the equation and setting the code to represent the hottest sensed temperature, $W_0$ can be attained.

For a normal range of temperature and with a meticulous selection of the parameters, the sizing values from Equation (7) results in residual nonlinearity that is too small to affect the accuracy of the sensor. However, for the proposed large range of −55° C. to 200° C., further strategies need to be employed to match the $V_{PTAT}$ 206 and $V_O$ 216 nonlinearities with each other.

The next step in the design is to perform simulations to individually investigate the nonlinearity sources involved in generating $V_{PTAT}$ 206 and $V_O$ 216. From simulations, as expected, it is observed that the reference voltage, $V_{REF}$ has an arch-shape nonlinearity, which is invariant to the sizing of the CMOS. However, imperfect mirroring of M1, M5 and M4, MP0-7 adds nonlinearities that can be controlled by the sizing of the transistors. Therefore, with proper sizing of M1, M5 and M4, MP0, one can make the nonlinearity of the $V_{PTAT}$ 206 generating part of the circuit to be close to the $V_{REF}$ 202 and mirroring the imperfection of the $V_O$ 216 side of the circuit. Hence, this effective cancellation of the nonlinearities with each other results in increased accuracy.

For controlling the nonlinearity, $|V_{PTAT} - V_O|$ is defined as the cost function C. $V_O$ 216 here is the generated $V_O$ voltage by setting the code to be the expected code with respect to the temperature. Function C can be considered to be dependent on the length and width of $V_{PTAT}$ generator transistors (Lp, Wp) as well as on the length and width of the $V_O$ generator transistors (Lo, Wo), or simply, $|V_{PTAT} - V_O| = C$ (Lp,Wp,Lo,Wo). By performing a gradient descent numerical optimization, the optimum sizing can be achieved that results in the desired value for C. The sum of the squared error (SSE) can be defined as follows:

$$SSE = \sum_{T=-55}^{T=200} 0.5 \times (V_{PTAT} - V_O)^2 \quad (8)$$

The target is to minimize SSE. To achieve this, start with the sizing values derived from Equation (7). To investigate the direction of the change by changing any of the four sizing parameters, the SSE is evaluated individually by changing each parameter for a small amount while the other three are constant. For instance, start with changing (increasing or decreasing) the Lp by less than 0.1%. Then, the new SSE is calculated and is named $SSE_N$. Finally, the updated value for Lp is obtained with the following equations:

$$\Delta SSE = SSE - SSE_N \quad (9)$$

$$L_{P\_New} = L_P - Rate \times \frac{\Delta SSE}{\Delta L_P}$$

The rate coefficient in Equation (9) is the learning rate, which can be determined by a few iterations. The same procedure is repeated for the other three sizing parameters to update values for the parameters. In the first attempt, the direction that these parameters should take can already be noted to match the nonlinearity of $V_O$ 216 and $V_{PTAT}$ 206 and hence, decrease the difference between $V_O$ 216 and $V_{PTAT}$ 206. Therefore, the procedure either can be continued as described until the desired SSE is achieved, or the most affecting parameter can be identified and arbitrary steps can be used to reach the desired degree of matching nonlinearity.

Due to process variation, the implementation of a calibration method for the adjustment of the sensor after fabrication is essential. Where most of the existing designs require access/adjustment of more than one temperature point for calibration, the presented design only requires calibration in one point in order to guarantee the desired 2° C. resolution. The calibration is performed by adjusting the sizing of the transistor MP0 326 in FIGS. 3A to 3D. This adjustment is performed digitally with 8 bits to maintain the 100% yield.

The resolution of the temperature sensor for more refined applications can be improved to 0.25° C. by deducting the average of the error curve that is the same for all the chips on a die from the digital transfer curve of the sensor.

Figure 4:
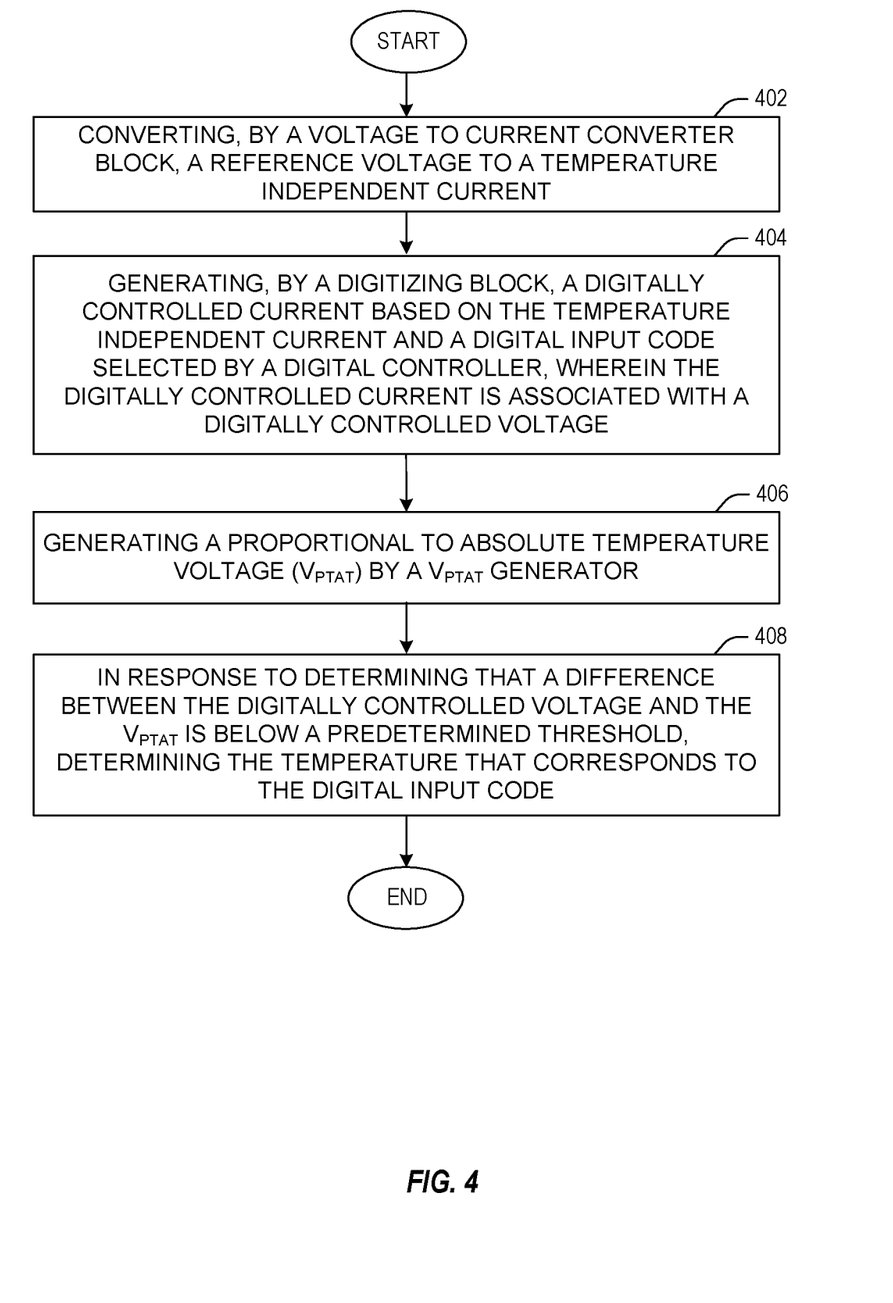
FIG. 4 is a flowchart of a method of operation of a temperature to digital converter to determine a temperature according to one or more embodiments of the present disclosure.

FIG. 4 discloses a flowchart of a method of operation of a temperature to digital converter to determine a temperature according to one or more embodiments of the present disclosure.

The method of FIG. 4 can begin at step 402 where the method includes converting, by a voltage to current converter block, a reference voltage to a temperature independent current.

At step 404, the method includes generating, by a digitizing block, a digitally controlled current based on the temperature independent current and a digital input code selected by a digital controller, wherein the digitally controlled current is associated with a digitally controlled voltage.

In an embodiment, the method can include selecting the digital input code, such that after the digital input code is applied to the temperature independent current to generate the digitally controlled current, non-linearities in the digitally controlled current cancel non-linearities in the $V_{PTAT}$.

In an embodiment, the non-linearities in the digitally controlled current comprise one or more of a) a temperature dependent non-linearity associated with the reference voltage, b) a non-linearity in the voltage to current converter block, and c) a non-linearity in the digitizing block. The non-linearities in the $V_{PTAT}$ can comprise one or more of a) a non-linearity in the $V_{PTAT}$ generator, and b) a non-linearity in a mirroring function associated with the $V_{PTAT}$ generator At step 406, the method includes generating a proportional to absolute temperature voltage ($V_{PTAT}$) by a $V_{PTAT}$ generator.

At step 408, the method includes in response to determining that a difference between the digitally controlled voltage and the $V_{PTAT}$ is below a predetermined threshold, determining the temperature that corresponds to the digital input code. In an embodiment, the predetermined threshold is less than or equal to 0.5 least significant bits. Additionally, in an embodiment, the temperature to digital converter is accurate to within 2° C. for a range between −55° C. to 200° C.

In an embodiment, in response to determining that the difference between the digitally controlled voltage and the $V_{PTAT}$ is above the predetermined threshold, the method can further include iteratively modifying the digital input code supplied to the digitizing block by the digital controller until the difference between the digitally controlled voltage and the $V_{PTAT}$ is below the predetermined threshold.

In an embodiment, the resistances of one or more resistors and selecting respective sizing ratios of a plurality of transistors in the temperature to digital converter can be selected such that ranges of the $V_{PTAT}$ and the digitally controlled voltage align for a predetermined temperature range.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the present disclosure. All such improvements and modifications are considered within the scope of the concepts disclosed herein.

What is claimed is:

1. A method of operation of a temperature to digital converter to determine a temperature, comprising:
   converting, by a voltage to current converter block, a reference voltage to a temperature independent current;
   generating, by a digitizing block, a digitally controlled current based on the temperature independent current and a digital input code selected by a digital controller, wherein the digitally controlled current is associated with a digitally controlled voltage;
   generating a proportional to absolute temperature voltage ($V_{PTAT}$) by a $V_{PTAT}$ generator; and
   in response to determining that a difference between the digitally controlled voltage and the $V_{PTAT}$ is below a predetermined threshold, determining the temperature that corresponds to the digital input code.

2. The method of claim 1, further comprising:
   in response to determining that the difference between the digitally controlled voltage and the $V_{PTAT}$ is above the predetermined threshold, iteratively modifying the digital input code supplied to the digitizing block by the digital controller until the difference between the digitally controlled voltage and the $V_{PTAT}$ is below the predetermined threshold.

3. The method of claim 1, wherein the predetermined threshold is less than or equal to 0.5 least significant bits.

4. The method of claim 1, wherein the temperature to digital converter is accurate to within 2° C. for a range between −55° C. to 200° C.

5. The method of claim 1, further comprising:
   selecting the digital input code, such that after the digital input code is applied to the temperature independent current to generate the digitally controlled current, non-linearities in the digitally controlled current cancel non-linearities in the $V_{PTAT}$.

6. The method of claim 5, wherein the non-linearities in the digitally controlled current comprise one or more of a) a temperature dependent non-linearity associated with the reference voltage, b) a non-linearity in the voltage to current converter block, and c) a non-linearity in the digitizing block.

7. The method of claim 5, wherein the non-linearities in the $V_{PTAT}$ comprise one or more of a) a non-linearity in the $V_{PTAT}$ generator, and b) a non-linearity in a mirroring function associated with the $V_{PTAT}$ generator.

8. The method of claim 1, further comprising:
   selecting resistances of one or more resistors and selecting respective sizing ratios of a plurality of transistors in the temperature to digital converter such that ranges of the $V_{PTAT}$ and the digitally controlled voltage align for a predetermined temperature range.

9. The method of claim 1, wherein the reference voltage and a current source for the $V_{PTAT}$ generator are generated by a Kuijk bandgap circuit.

10. A temperature to digital converter circuit that determines a temperature, comprising:
 a voltage to current converter block that converts a reference voltage to a temperature independent current;
 a digital controller that selects a digital input code;
 a digitizing block that generates a digitally controlled current based on the temperature independent current and the digital input code, wherein the digitally controlled current is associated with a digitally controlled voltage;
 a proportional to absolute temperature voltage ($V_{PTAT}$) generator that generates a $V_{PTAT}$; and
 the digital controller determines that a difference between the digitally controlled voltage and the $V_{PTAT}$ is below a predetermined threshold, and determines the temperature that corresponds to the digital input code.

11. The temperature to digital converter circuit of claim 10, wherein in response to determining that the difference between the digitally controlled voltage and the $V_{PTAT}$ is above the predetermined threshold, the digital controller iteratively modifies the digital input code supplied to the digitizing block by the digital controller until the difference between the digitally controlled voltage and the $V_{PTAT}$ is below the predetermined threshold.

12. The temperature to digital converter circuit of claim 10, wherein the predetermined threshold is less than or equal to 0.5 least significant bits.

13. The temperature to digital converter circuit of claim 10, wherein the temperature to digital converter is accurate to within 2° C. for a range between −55° C. to 200° C.

14. The temperature to digital converter circuit of claim 10, wherein the digital controller selects the digital input code such that after the digital input code is applied to the temperature independent current to generate the digitally controlled current, non-linearities in the digitally controlled current cancel non-linearities in the $V_{PTAT}$.

15. The temperature to digital converter circuit of claim 14, wherein the non-linearities in the digitally controlled current comprise one or more of a) a temperature dependent non-linearity associated with the reference voltage, b) a non-linearity in the voltage to current converter block, and c) a non-linearity in the digitizing block.

16. The temperature to digital converter circuit of claim 14, wherein the non-linearities in the $V_{PTAT}$ comprise one or more of a) a non-linearity in the $V_{PTAT}$ generator, and b) a non-linearity in a mirroring function associated with the $V_{PTAT}$ generator.

17. The temperature to digital converter circuit of claim 10, wherein resistances of one or more resistors and respective sizing ratios of a plurality of transistors in the temperature to digital converter are selected such that ranges of the $V_{PTAT}$ and the digitally controlled voltage align for a predetermined temperature range.

18. The temperature to digital converter circuit of claim 10, further comprising a Kuijk bandgap circuit that generates the reference voltage and a current source for the $V_{PTAT}$ generator.

* * * * *